(12) United States Patent
Selker

(10) Patent No.: US 6,229,697 B1
(45) Date of Patent: May 8, 2001

(54) NOTEBOOK COMPUTER HAVING A RESILIENT, PORTFOLIO-TYPE CASE

(75) Inventor: Edwin Joseph Selker, Palo Alto, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/414,077

(22) Filed: Oct. 6, 1999

(51) Int. Cl.$^7$ ........................................ G06F 3/147
(52) U.S. Cl. .................. 361/683; 361/725; 361/687
(58) Field of Search .................... 361/683, 724, 361/725, 726, 727, 680, 681, 687

(56) References Cited

U.S. PATENT DOCUMENTS

| | | | |
|---|---|---|---|
| 5,566,098 | * 10/1996 | Lucente et al. | 361/681 |
| 5,607,054 | * 3/1997 | Hollingsworth | 206/320 |
| 5,629,832 | * 5/1997 | Sellers | 361/680 |
| 5,872,557 | * 2/1999 | Wiemer et al. | 361/683 |
| 6,028,764 | * 2/2000 | Richardson et al. | 361/681 |
| 6,055,153 | * 4/2000 | Chiu et al. | 361/687 |
| 6,067,224 | * 5/2000 | Nobuchi | 361/683 |

* cited by examiner

Primary Examiner—Leo P. Picard
Assistant Examiner—Hung Van Duong

(74) Attorney, Agent, or Firm—Robert Buckley; Marc D. McSwain

(57) ABSTRACT

A notebook computer having a resilient, portfolio-type case includes a large flat-panel display module and a processor-keyboard module constructed into the case so that the case need not be stored separately during use. The case is secured for carrying by a slide fastener, and the angle between the display and the keyboard is adjustable by positioning of the slider in the open position. Crushable corners, an extending, protective lip, and a resilient, rugged material provide added protection for the computer while in use and while being transported. The two functional modules are electrically interconnected via inexpensive flex cable routed along the fold between opposed halves. The computer includes a removable, multipurpose writing pad that folds into the case serving as a protective cover for the keyboard in the open position, and is detachable and insertable between the flat display panel and the keyboard during transport. When opened, the writing pad is attachable by snap button to opposite ends of the computer for both left-handed and right-handed users. The writing pad provides a large, flat surface suitable for writing and for operation of an external computer pointing device such as a mouse. The detachable writing pad folds across the keyboard in the open position when the computer is not in use, and alternatively attaches to the bottom of the protective cover for carrying, or is detached and stowed between the keyboard and the flat panel display for storage.

5 Claims, 4 Drawing Sheets

NOTEBOOK COMPUTER HAVING A RESILIENT, PORTFOLIO-TYPE CASE

FIELD OF THE INVENTION

The invention relates to the field of information processing systems, and more specifically to a notebook computer having a resilient, portfolio-type case. The invention has particular application to the IBM® ThinkPad® line of notebook computers (IBM and ThinkPad are registered trademarks of the International Business Machines Corporation, Armonk, N.Y.).

BACKGROUND OF THE INVENTION

There are a number of portfolio-type notebook computers (see U.S. Pat. Nos. 5,607,054 and 5,887,723 and the references cited therein). A general problem is that portfolio type cases generally provide protection but the computer is often removed from the case during use such that the case must be stored in a location away from the computer.

SUMMARY OF THE INVENTION

The present invention solves this problem by making the portfolio case a permanent part of the notebook computer. The case not only protects the computer but provides structural support for its elements.

The invention provides a rugged, attractive folio-type case folded along a line to form opposed halves. A slide fastener is attached around the periphery to provide secure closure. A large flat-panel display module is built into one opposed half, while a processor-keyboard module is built into the opposite half. The modules are interconnected using inexpensive flex cable routed between the units along the fold.

The processor-keyboard includes a large wrist rest area below the keyboard providing operating buttons for a built-in pointing device. An external pointing device is attachable via a PS/2 type connector. The angle between the display and the keyboard is adjustable by user positioning of the slide fastener slider near the fold region. To increase the angle, the slider is moved closer to the fold; to decrease the angle, the slider is moved a small amount in the opposite direction.

A protective lip and crushable corners formed by an extension of the protective cover beyond the edges of the keyboard and display provides added protection against mechanical shock.

A removable, multipurpose writing pad is attachable at either end of the computer case to accommodate the needs of both left- and right-handed users. The writing pad folds under the case when not used. It is attached by snap button to the bottom of the computer for transport, and is foldable over the keyboard for protection in the open position such as while being used at a desk or table top. When removed and inserted between the display and the keyboard during transport, the writing pad protects both the display and the keyboard from damage.

Advantages of the invention are the simple adjustment of the angle of display, the use of an inexpensive flex cable to interconnect the functional modules, the crushable corners and protective extending lips, the possibility of using a very large flat panel display because of increased room within the case, the removable, multipurpose writing pad, the fact that the carrying case doesn't have to be stored during use and so is impossible to lose, and an attractive, rugged case that has an estimated life of 2–3 years.

BRIEF DESCRIPTION OF THE DRAWING

For a further understanding of the objects, features and advantages of the present invention, reference should be taken to the following description of the preferred embodiment, taken in conjunction with the accompanying drawing, in which like parts are given like reference numerals and wherein.

DESCRIPTION OF THE PREFERRED EMBODIMENT

Figure 1:
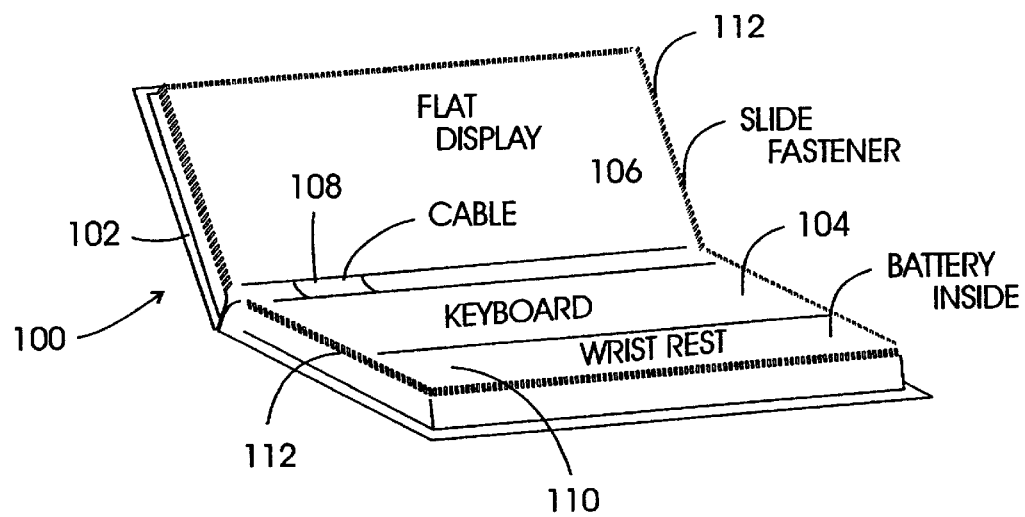
FIG. 1 is a front perspective view of a notebook computer having a resilient, portfolio-type case and shown in an open position.

With reference to FIG. 1, there is shown a front perspective view of a notebook computer having a resilient, portfolio-type case displayed in an open position. The notebook computer is designated, generally, by the reference numeral 100 and includes a portfolio-type case 102, a processor-keyboard assembly 104, a flat display assembly 106, an interconnecting cable assembly 108, a wrist rest area 110, and a slide fastener 112.

The portfolio-type case 102 is preferably made of a resilient, protective material folded along a line to form opposed halves. The folded protective material defines an open position (shown) in which the opposed halves of the portfolio-type case support the flat display assembly 106 and the processor-keyboard assembly 104 in a notebook computer relationship with respect to one another. As used here, the phrase "notebook computer relationship" means that the display 106 is located above the processor-keyboard assembly 104 so that a person using the notebook computer is able to look directly into the display while using the keyboard for typing and commanding the computer. The folded protective material also defines a closed position (illustrated in FIGS. 3, 4 and 5) in which the two assemblies 104, 106 are enclosed within the protective portfolio-type case 102. The interconnecting cable assembly 108 connects the two computer assemblies together to form a fully functional notebook computer.

Figure 2:
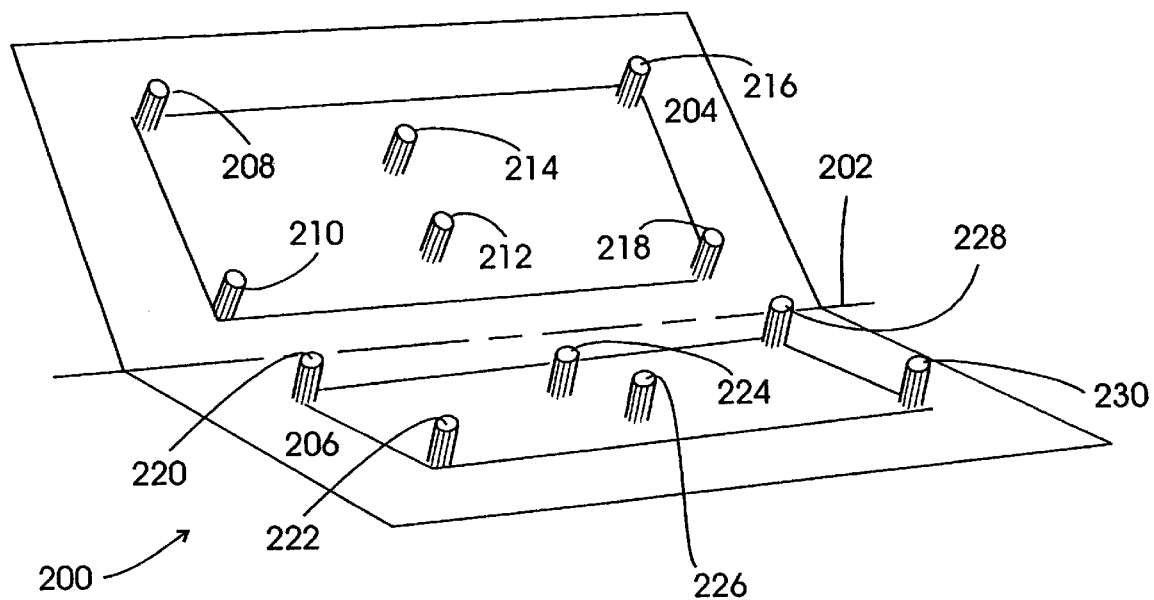
FIG. 2 is a front perspective view of a resilient, portfolio-type case, including structural support members such as used in the notebook computer illustrated in FIG. 1.

FIG. 2 is a front perspective view of the folder resilient, protective material used to form the case for the notebook computer illustrated in FIG. 1. The folded material is designated generally by the reference numeral 200. The material 200 is folded about a fold line 202 to form two opposed halves 204, 206 respectively.

A plurality of structural supports 208–218 and 220–230 are disposed on the two opposed halves of the folded, protective material 200. In a specific embodiment of the invention, as shown in FIG. 2, the structural supports 208–218 are formed of molded plastic and include a support base 232. In similar manner, the structural supports 220–230 are formed of molded plastic and include a support base 234. Each support base 232, 234 is bonded to an opposed half, 204, 206 respectively, of the folded material 200. In another specific embodiment, the structural supports 208–218 (220–230) and included support base 232 (234) are formed of machined metal such as aluminum. In a specific embodiment, each structural support 208–230 includes a threaded bore for easily attaching other structural elements using screws. In yet another embodiment, each structural support 208–230 includes a bore-like recess suitable for use with self-tapping screws and the like. The bore-like recess is molded into a structural support to reduce the manufacturing cost.

The resilient, protective portfolio-type case 102 (FIG. 1) provides a framework upon which the notebook computer is assembled. This framework is distinguished from a typical portfolio carrying case used for some notebook computers. In such devices (see for example U.S. Pat. Nos. 5,607,054 and 5,887,723) a notebook computer having its own plastic or metal case is stored inside a protective, portfolio-type cover. In the present invention, however, the computer is actually built into the portfolio-type case, just as a notebook computer is normally built into its plastic or metal protective case. In the usual notebook computer, the protective case provides structural support for a display assembly and a processor-keyboard assembly which are interconnected by cable. The case retains the two assemblies in the typical "notebook computer elationship" with each other. In the present invention, the same purpose is served by he portfolio-type case and the structural support members. Specific advantages of the present invention—addition to its durability and attractive appearance—are that when the computer is in use, its case does not have to be stored in another location and, as a result, is not forgotten or misplaced.

Figure 3:
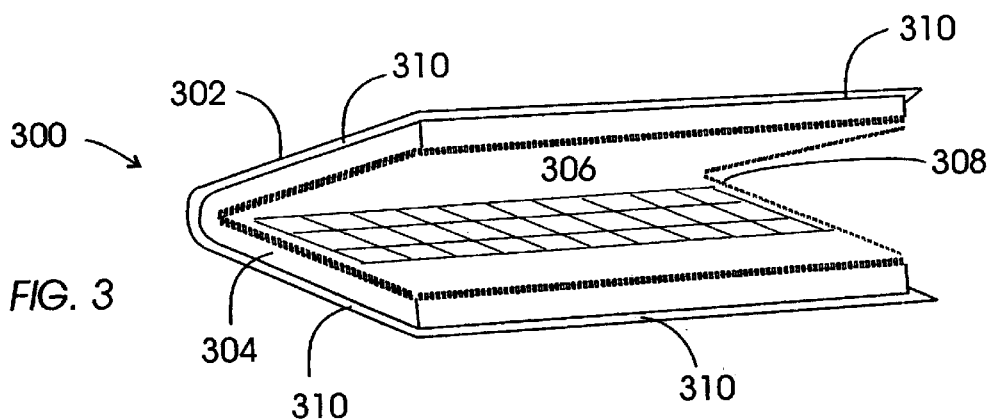
FIG. 3 is another front perspective view of the notebook computer of FIG. 1 shown in a nearly closed position.

FIG. 3 is another front perspective view of the notebook computer of FIG. 1 shown in a nearly closed position. The computer is designated generally by the reference numeral 300, and includes a folded protective case 302, a slide fastener 304, display module 306, and processor-keyboard module 308. The attachment of the slide fastener 304 to an outer edge of the cover 302 creates a protective lip 310 extending outwardly along the entire slide fastener.

Figure 4:
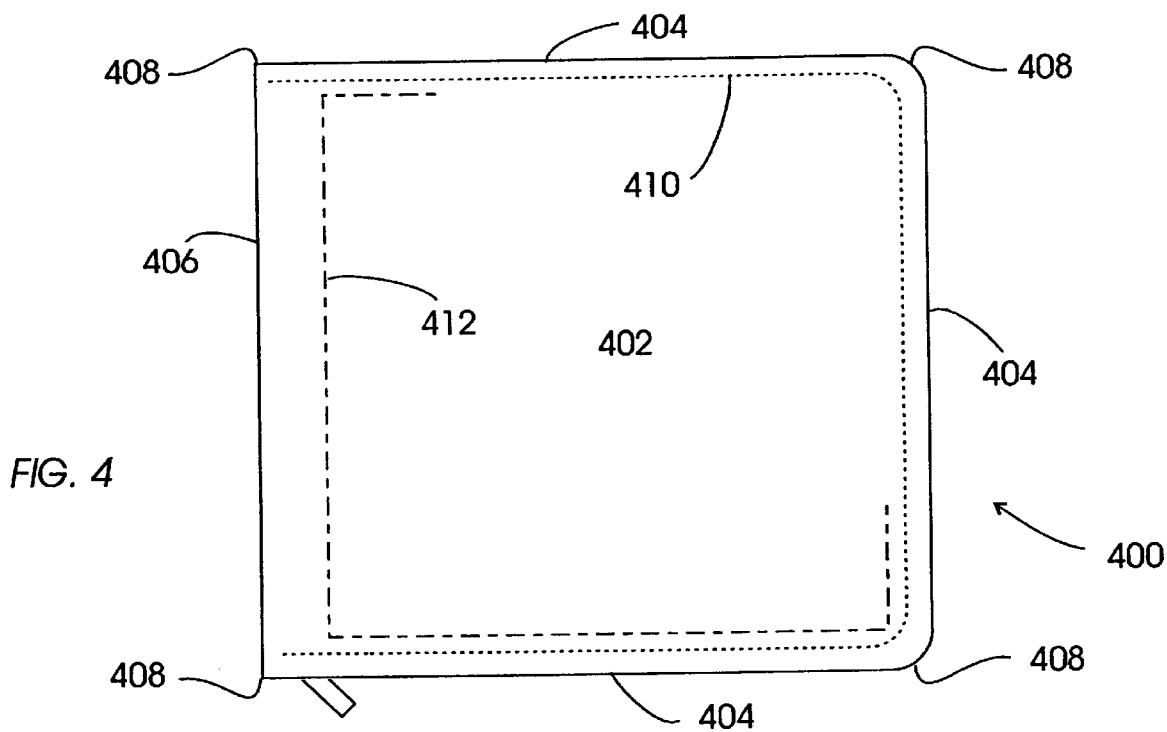
FIG. 4 is a top view of the notebook computer of FIGS. 1–3 shown in a closed position.

FIG. 4 is a top view of the notebook computer of FIGS. 1–3 shown in a closed position. The computer is designated generally by the numeral 400, and includes an outer, protective cover of a resilient material 402 having protective lips 404 along three is edges, and a fold 406 along a fourth edge. The configuration creates crushable corners 408. The protective lips 404, fold 406, and crushable corners 408 provide additional protection to the functional modules within the computer case. The dashed line 410 represents attachment of the slide fastener to the cover material, while the long-short dashed line 412 represents an outline of the functional modules within the computer case. The protective lips, fold and crushable corners are seen to extend significantly beyond the periphery of the functional modules, providing increased protection to the two modules.

Figure 5:
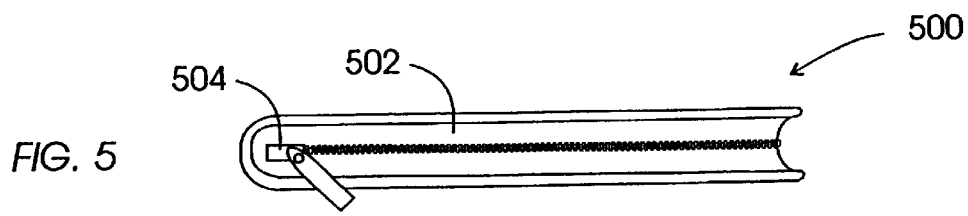
FIG. 5 is an end view of the notebook computer of FIGS. 1–4 shown in a closed position.

FIG. 5 is an end view of the notebook compute of FIGS. 1–4 shown in a closed position. The computer is designated generally by the numeral 500, and includes a slide fastener 502 and a slider 504.

Figure 6:
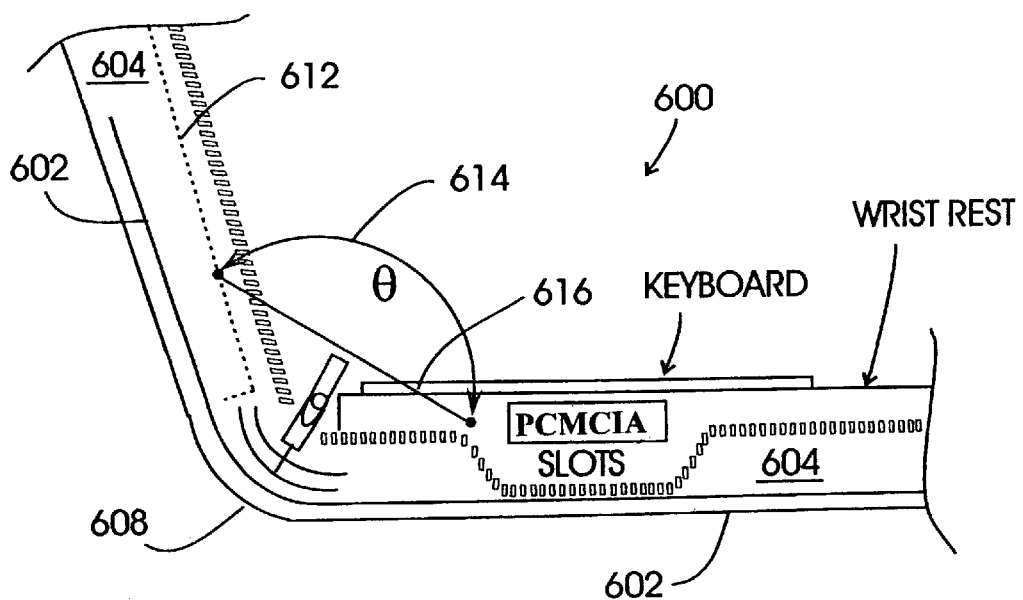
FIG. 6 is a partial end view of the notebook computer of FIGS. 1–5 showing details of the slider used to adjust an angle between the display and the keyboard.

FIG. 6 is a partial end view of the notebook computer of FIGS. 1–5 showing details of the slider used to adjust an angle between the display and the keyboard. The portion of the computer shown is designated generally by the numeral 600, and includes a folded cover 602 shown in an open position, a slide fastener 604, a slider 606 adjacent a fold 608. A portion of a processor-keyboard module 610 is visible. A portion of a display module is represented by a dashed line 612.

The slider 606, the material of the slide fastener 604, and the resilient material of the folded cover 602 all cooperate to maintain the angle 614 between the display and the keyboard in a relatively fixed relation. To decrease the angle, the slider 606 is moved farther away from the fold 608, while to increase the angle, the slider is moved closer to the fold. In an alternative embodiment, a strap 616 of fixed length is used to limit a backward travel of the display with respect to the keyboard for a predetermined viewing angle. The strap is attached at opposed ends to the display module 612 and the processor-keyboard module 610, respectively, and folds when the case is in the closed position.

Figure 7:
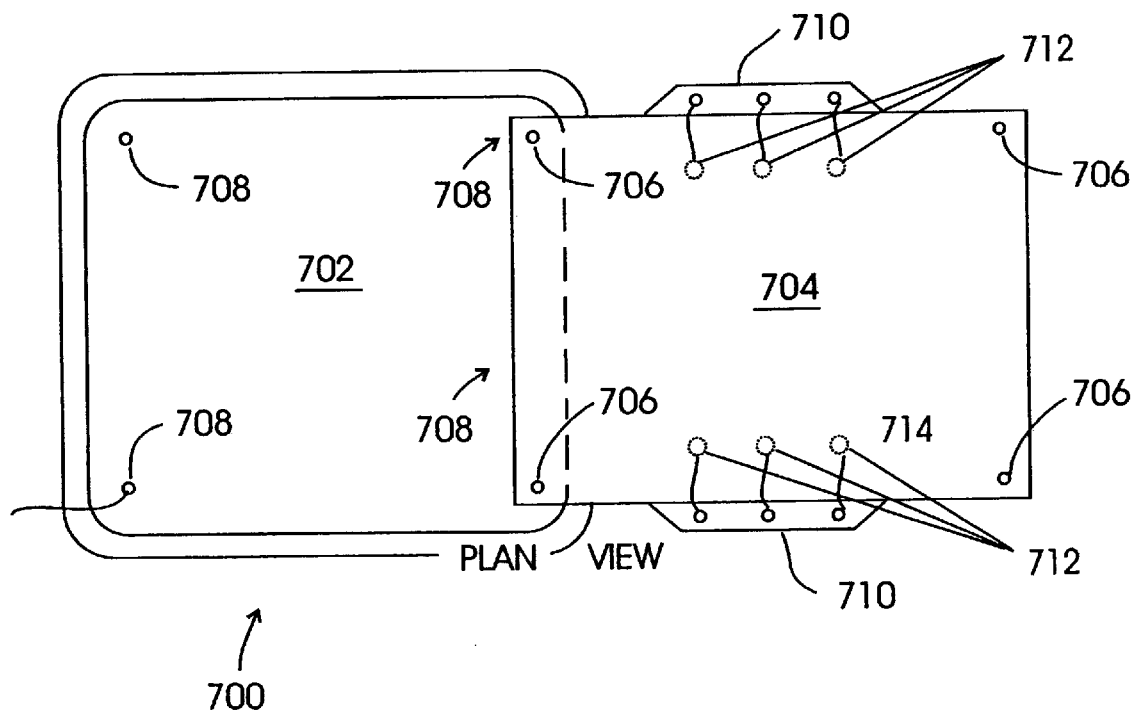
FIG. 7 is a plan view of the bottom of the notebook computer showing the details of a detachable, multipurpose writing pad.

FIG. 7 is a plan view of the bottom of the notebook computer showing details of a detachable, multipurpose writing pad. The computer is designated generally by the reference numeral 700, and includes a bottom portion of a protective portfolio-type case 702, a detachable multipurpose writing pad 704, snap buttons 706, mating snaps 708, retaining flaps 710, magnets 712, and covered magnetic material 714.

The writing pad 704 is approximately the size of the bottom 702 of the computer 700. Four snap buttons 706 are located near the corners of the writing pad 704. Four mating snaps 708 are located near the corners of the bottom 702 of the computer. The writing pad 704 is connectable to the bottom of the computer by attaching all four snap buttons 706 to mating buttons 708. The writing pad is also attachable to either end of the computer for use by both left- and right-handed persons. When attached at one end, two of the snap buttons 706 engage two of the mating buttons 708, as illustrated, permitting the pad 704 to extend from one end to one side of the computer for use as a writing surface and for using an external pointing device (not shown).

Two retaining flaps 710 extend from opposed sides of the multipurpose writing pad 704. The retaining flaps are made of a flexible material and are foldable over the writing pad for retaining papers. Magnets 712 located within each retaining flap and covered magnetic material 714 located within the writing pad 704 hold each retaining flap in a retaining position during use in retaining writing materials on the pad 704. The retaining flaps are usable for retaining paper placed on either surface of the multipurpose writing pad 704.

Figure 8:
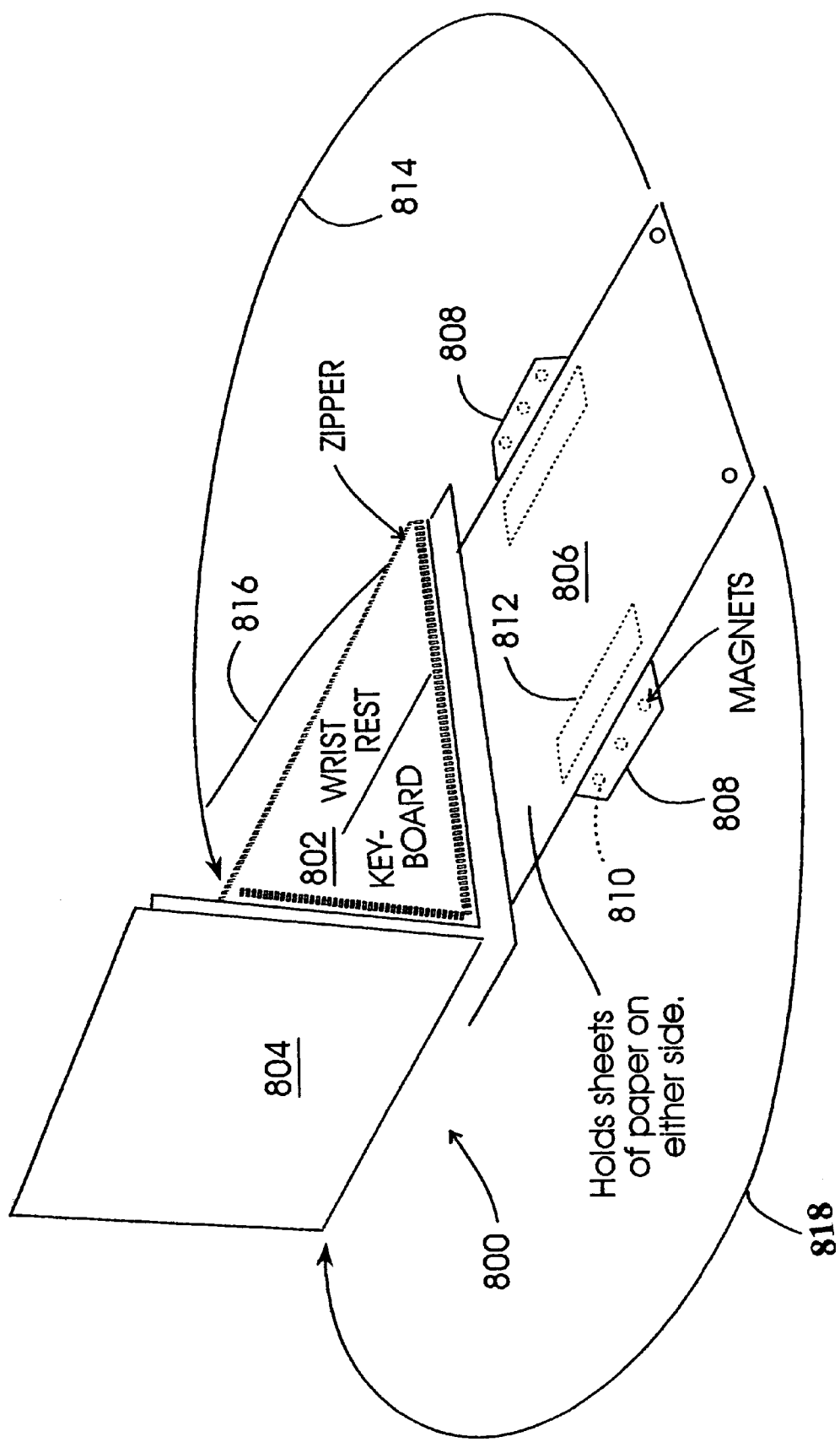
FIG. 8 is a perspective view of the notebook computer showing the use of the writing pad of FIG. 7 to protect the keyboard when the case is in an open position.

FIG. 8 is a perspective view of the notebook computer showing the use of the writing pad of FIG. 7 to protect the keyboard when the case is in an open position. The notebook computer is designated generally by the numeral 800, and includes a processor-keyboard module 802, a protective cover 804, a detachable, multipurpose writing pad 806, opposed retaining flaps 808, concealed magnets 810, and concealed magnetic material 812.

The writing pad 806 is shown in a writing/working position extending from one end of the computer. When the computer is being used on a desktop, the writing pad 806 is folded (arc 814) across the keyboard to form a protective cover 816. When the writing pad is not being used, the retaining flaps 808 are first folded under the writing pad 806, and then the writing pad is folded under the computer (arc 818) for storage. The writing pad is retained in a position under the computer by the snap buttons located at its corners (FIG. 7).

While the invention has been described in relation to the embodiments shown in the accompanying Drawing figures, other embodiments, alternatives and modifications will be apparent to those skilled in the art. It is intended that the Specification be exemplary only, and that the true scope and spirit of the invention be indicated by the following claims.

What is claimed is:

1. A notebook computer, comprising:
   a portfolio-type case of a resilient protective material folded along a line to form opposed halves defining an open position and a closed position;
   structural supports disposed on the opposed halves of the portfolio-type case;
   a processor-keyboard assembly attached to the structural supports disposed on one opposed half of the case;
   a flat display assembly attached to the structural supports disposed on the opposite half of the case such that the two assemblies are in a notebook computer relation with one another when the case is in the open position;
   an electrical cable connecting the display assembly to the processor-keyboard assembly to form a functional computer; and
   a removable, multipurpose writing pad,
   the functional computer being protected when the case is in the closed position and useable as a computer when the case is in the open position,
   whereby the notebook computer has a rugged, attractive case which does not have to be stored in a location separate from the computer, and wherein the writing pad includes opposed retaining flaps foldable across a portion of the writing pad for retaining work papers.

2. A notebook computer, comprising:
   a portfolio-type case of a resilient, protective material folded along a line to form opposed halves defining an open position and a closed position;
   structural supports disposed on the opposed halves of the portfolio-type case;
   a processor-keyboard assembly attached to the structural supports disposed on one opposed half of the case;
   a flat display assembly attached to the structural supports disposed on the opposite half of the case such that the two assemblies are in a notebook computer relation with one another when the case is in the open position;
   an electrical cable connecting the display assembly to the processor-keyboard assembly to form a functional computer; and
   a removable, multipurpose writing pad,
   the functional computer being protected when the case is in the closed position and useable as a computer when the case is in the open position,
   whereby the notebook computer has a rugged, attractive case which does not have to be stored in a location separate from the computer, and wherein the retaining flaps are retained in a folded position by concealed magnets and magnetic material.

3. A notebook computer having a resilient, portfolio-tape case, comprising:
   a portfolio-type case of a resilient, protective material folded along a line to form opposed halves defining an open position and a closed position;
   a processor-keyboard module attached to one half of the case;
   a flat display module attached to an opposed half of the case and including a large display;
   an inexpensive flex cable electrically connecting the processor-keyboard module with the display module to form a functional computer;
   the portfolio-type case providing structural support for maintaining the two modules in a notebook relation with one another; and
   each module being attached to an opposing half such that the modules are protected when the case is in the closed position and are usable as a computer when the case is in the open position;
   the two halves of the portfolio-type case being secured in the closed position by a slide fastener attached along an outer edge of the resilient, protective material;
   an angle between the display module and the processor-keyboard module being adjustable by user adjustment of the slide fastener position near the fold line; and
   the resilient, portfolio-type case including crushable corners and a protective lip extending beyond the attached slide fastener,
   whereby the notebook computer has a rugged, attractive case that does not have to be stored separately when the computer is in use and wherein the writing pad is foldable across the processor-keyboard module for protecting the keyboard.

4. A notebook computer having a resilient, portfolio-type case, comprising:
   a portfolio-type case of a resilient, protective material folded along a line to form opposed halves defining an open position and a closed position;
   a processor-keyboard module attached to one half of the case;
   a flat display module attached to an opposed half of the case and including a large display;
   an inexpensive flex cable electrically connecting the processor-keyboard module with the display module to form a functional computer;
   the portfolio-type case providing structural support for maintaining the two modules in a notebook relation with one another; and
   each module being attached to an opposing half such that the modules are protected when the case is in the closed position and are usable as a computer when the case is in the open position;
   the two halves of the portfolio-type case being secured in the closed position by a slide fastener attached along an outer edge of the resilient, protective material;
   an angle between the display module and the processor-keyboard module being adjustable by user adjustment of the slide fastener position near the fold line; and
   the resilient, portfolio-type case including crushable corners and a protective lip extending beyond the attached slide fastener,
   whereby the notebook computer has a rugged, attractive case that does not have to be stored separately when the computer is in use, and wherein the writing pad is stowable between the display module and the processor-keyboard module when the protective cover is in a closed position for protecting both the display and the keyboard.

5. A notebook computer is constructed entirely within a portfolio-type case of a resilient, protective material folded along a line to form opposed halves defining open and closed positions; the computer includes a flat-panel display module and a processor-keyboard module interconnected via inexpensive flex cable along the fold; the protective material extends beyond the edges of the two functional modules providing both a protective lip along the edges and fold and protective, crushable corners; a slide fastener is attached along an outer edge of the protective material to secure the computer in the closed position for transport and storage; the slide of the fastener is user adjustable near the region of the fold for adjusting an angle between the display and the keyboard, the slide, fastener, and protective material cooperating to maintain the angle in a fixed relation once adjusted; a removable multipurpose writing pad is attachable along either end of the computer case for use by left- and right-handed persons; the writing pad folds into the case forming a protective barrier across the keyboard in the open position, and attaches under the computer for transport, whereby both the case and the multipurpose writing pad need not be separately stored during use.

* * * * *